[11] 3,631,785

| | | | |
|---|---|---|---|
| [72] | Inventors | David E. Perlman;<br>Daniel F. Wiktorski, both of Rochester, N.Y. | |
| [21] | Appl. No. | 64,113 | |
| [22] | Filed | July 30, 1970 | |
| [45] | Patented | Jan. 4, 1972 | |
| [73] | Assignee | Eastman Kodak Company<br>Rochester, N.Y.<br>Continuation of application Ser. No. 786,024, Dec. 23, 1968. This application July 30, 1970, Ser. No. 64,113 | |

[54] AUTOMATIC FOCUSING DEVICE
11 Claims, 5 Drawing Figs.
[52] U.S. Cl.......................................... 95/44,
250/201, 250/204, 352/140, 356/126
[51] Int. Cl................................................. G03b 3/00
[50] Field of Search............................................ 95/44, 44
C, 45; 352/104; 250/204, 201; 356/122–128

[56] References Cited
UNITED STATES PATENTS
2,968,994 1/1961 Shurcliff........................ 356/122 X
3,274,914 9/1966 Biedermann et al.......... 95/44
3,450,883 6/1969 Thomas......................... 250/204
3,538,334 11/1970 Shaffer, Jr. ................... 356/123 X
3,555,280 1/1971 Richards, Jr.................. 95/44 X Primary Examiner—Samuel S. Matthews
Assistant Examiner—Richard M. Sheer
Attorney—Robert W. Hampton ABSTRACT: This disclosure relates to an automatic focusing device for use in a photographic camera having a lens system movable in predetermined incremental displacements between near and hyperfocal positions in relation to a subject to be photographed. The light reflected from a preselected area on the subject is divided into two light paths, one unmodulated and the other modulated at a predetermined frequency by a rotating reticle serving as a filter to convert spatial into temporal frequencies. Provision is made for subtracting the intelligence in the two light paths to eliminate the large steady-state light component reflected from the subject, and the small modulation resulting from the relative displacement between the successive focused image of the subject and the rotating reticle is utilized to detect a null signal when the subject is in focus for the purpose of arresting displacement of the lens system.

3,631,785

AUTOMATIC FOCUSING DEVICE

This in a continuation of application Ser. No. 786,024, filed Dec. 23, 1968.

CROSS-REFERENCE TO RELATED APPLICATION

See the copending application for "Complementary Emitter Follower," Ser. No. 699,437 filed on Jan. 22, 1968 in the name of David E. Perlman, now U.S. Pat. Ser. No. 3,517,324, and assigned to the same assignee as the instant invention.

BACKGROUND OF THE INVENTION

1. Field of the Invention

This invention relates to an automatic focusing device for use in photographic cameras or the like having a lens means movable in predetermined incremental steps between near and hyperfocal positions in seeking the true focus to a subject to be photographed. Provision is made for detecting a null at the correct focus for the subject, for the purpose of arresting further displacement of the lens means.

2. Description of the Prior Art

It is broadly known in the art to utilize an interceptor grating to provide intelligence signals for automatic range finding or focusing. For example, U.S. Pat. No. 2,524,807 to H. E. Kallmann for "Optical Automatic Range Determining Device" discloses that an interceptor grating yields a maximum signal when it is coplanar with a sharp image plane, and correspondingly smaller signals the farther it is displaced in either direction therefrom.

SUMMARY OF THE INVENTION

This invention relates to an automatic focusing device suitable for use in a camera or the like having lens means movable in predetermined incremental displacements between near and hyperfocal positions in search of the true focus setting in relation to the subject to be photographed.

Means are provided for receiving reflected light from a preselected area on the subject to be photographed. The received reflected light is then projected along first and second light channel paths. Means are arranged for modulating the projected light in the first light path to provide modulated light signals. The projected light in the second light channel path is selectively passed so as to equalize the light intensity in both paths, and provide unmodulated light signals. First and second photoelectric transducer means positioned in the first and second light channels receive the modulated and unmodulated light signals respectively, and provide successive differential AC electrical output signals which effectively eliminate the background or steady-state component of the light intensity reflected from the subject. The differential AC electrical output signals are then passed to circuit means where they are processed to derive a control signal pulse when the AC electrical output signals depart in magnitude from the average peak potential at true focus, the control signal pulse being usable to enable the displacement of the lens means to be arrested at substantially true focus.

An object of this invention is to provide an automatic focusing arrangement for photographic cameras, particularly suitable for zoom lens motion picture cameras.

The novel features of the invention are set forth with particularity in the appended claims, the invention itself, however, both as to its organization and method of operation together with further objects and advantages thereof may best be understood by reference to the description to follow considered in connection with the accompanying drawings.

DESCRIPTION OF THE PREFERRED EMBODIMENTS

The invention about to be described will be illustrated in connection with a zoom lens movie camera, although it will be understood that the inventive concept will find equal utility in other fields.

The name zoom lens is applied generally to any lens system with a variable focal length. Zoom lenses were first used on television cameras and have gradually progressed into the professional and amateur movie camera fields. The variation in focal length in a zoom lens is accomplished by moving one or more lens components longitudinally along the optical axis of the system.

Figure 1:
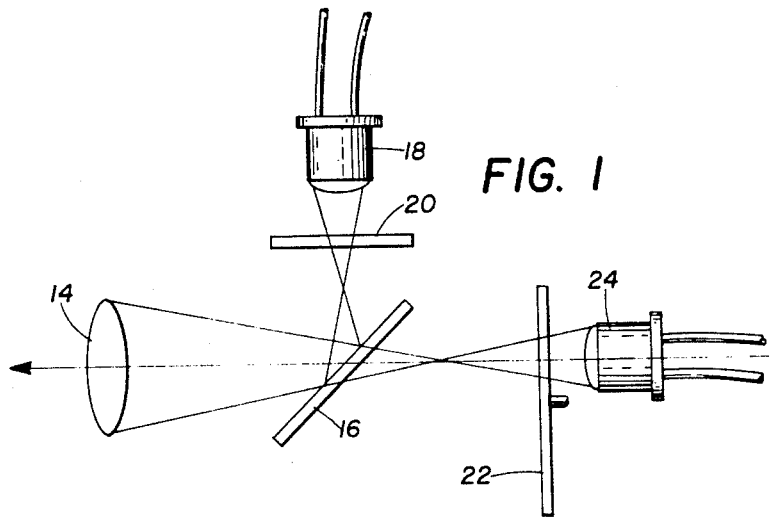
FIG. 1 is a diagrammatic view showing an arrangement for deriving optical intelligence from a scene, and utilizing dual photoconductive transducer means in accordance with the automatic focusing device of this invention.
Figure 2:
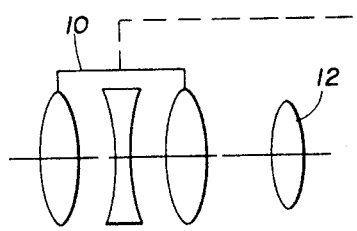
FIG. 2 is a block diagram of the automatic focusing device in accordance with this invention.
Figure 2:
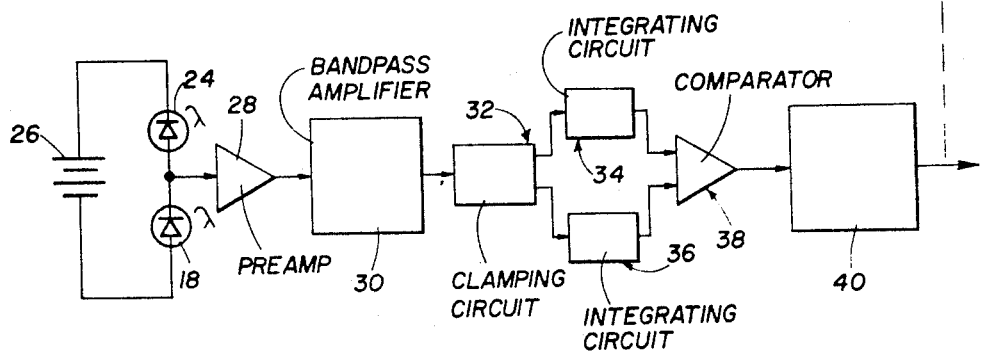

Referring now to FIGS. 1 and 2, the zoom lens portion of a three-component zoom lens system is identified at 10; the fixed or relay lens component is indicated at 12. The movie camera, of which the automatic focusing device of this invention is a part, contains a viewfinder on which is delineated a small area which is to be aimed by the operator at the subject to be focused; the lens means 14 of the automatic focusing device "sees" only that which is contained within this small area in order to avoid receiving optical intelligence from objects which are not of interest and which could give a spurious response. The optical information received by the lens means 14 may be obtained from a separate independent optical arrangement (not shown) or the required optical information may be derived from the main zoom lens 10, 12 by auxiliary optical components (not shown). The techniques for satisfying these requirements are well known in the art and need not be described here since they are not part of the instant invention.

The light from the preselected area on the subject is reflected to a lens means 14, and is passed to a beam splitter indicated at 16, which directs the light to a photoconductive transducer means here illustrated as a photodiode 18, after first passing through a neutral density filter 20; the received light passed by the beam splitter 16 as shown in FIG. 1, is interrupted by a rotating reticle 22, the resulting modulated beam of light falling on another photoconductive transducer means here illustrated as a photodiode 24. With present day integrated-circuit manufacturing techniques, the photodiodes 18, 24 can be perfectly matched and balanced. The reticle 22 comprises a disk, rotated in an convenient manner, upon which are alternate light and dark radial bars at a spatial frequency high enough so that the percentage modulation resulting from the relative motion between the reticle and the subject scene will be a sensitive function of focus.

Referring now to FIG. 2 the photodiodes 18, 24 are connected as shown with reverse bias applying to the PN-junction by means of battery 26 as shown. The output of the photodiode pair 18, 24 is connected to a preamplifier indicated at 28. The details of the preamplifier are not shown since they form no part of the present invention. The preamplifier used in this illustrated embodiment is the subject of a copending patent application for "Complementary Emitter Follower," Ser. No. 699,437 filed on Jan. 22, 1968 in the name of David E. Perlman, now Pat. Ser. No. 3,517,324, and assigned to the same assignee as the instant invention. Briefly, this amplifier has a very high input impedance and is extremely stable. The output of the preamplifier 28 is applied to a band-pass amplifier indicated at 30; the output of the band-pass amplifier 30 is conveyed to a clamping circuit indicated generally at 32. The clamping circuit provides inputs to first and second integrator circuit means indicated generally at 34, 36 respectively. The outputs of these integrator circuits are applied as inputs to comparator circuit means indicated generally at 38. The comparator circuit means provides an inhibitor pulse input signal to an electric motor 40 which is coupled to and controls the displacement of the zoom lens 10.

Figure 3:
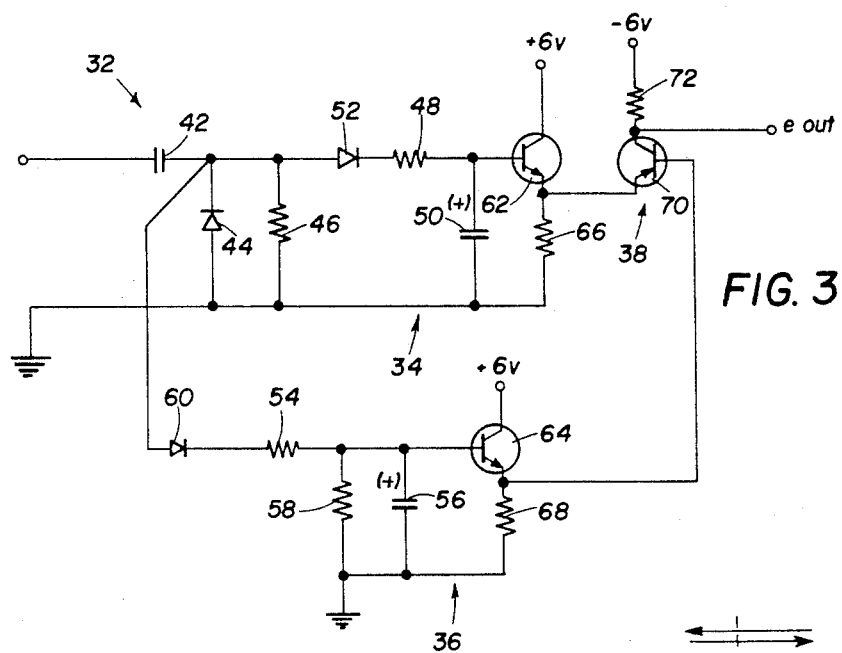
FIG. 3 is a circuit diagram of the clamping, integrator, and comparator circuitry shown in block form in FIG. 2.

The detailed arrangement of the clamping, integrator, and comparator circuits 32, 34, 36 and 38 is shown in greater electrical detail in FIG. 3. The clamping circuit 32 comprises: capacitor 42, diode 44, and resistor 46. The diode 44 is connected with its anode to a reference or ground potential as indicated, and its cathode connected to one side of capacitor 42. The output of the clamping circuit 32 is applied to the integrator circuit means 34 and 36.

The first integrator circuit means 34 comprises: resistor 48, electrolytic capacitor 50, and blocking diode 52. The second integrator circuit means 36 comprises: resistor 54, electrolytic capacitor 56 in parallel with bleed resistor 58 and blocking diode 60 serially connected with resistor 54.

The outputs of the integrator circuits 34, 36 are applied to interface or isolation transistors 62, 64 respectfully. The transistor 62 is of the NPN type having its base connected to the junction of resistor 48 and capacitor 50, with its emitter connected to ground through a resistor 66; the collector is connected to a source of bias voltage, Vcc which in the illustrative embodiment is +6 v. The interface transistor 64 is also of the NPN type having its collector connected to a source of bias voltage Vcc which in the illustrative embodiment is +6 v. and its emitter connected to ground through resistor 68. The base of transistor 64 is connected to capacitor 56.

The comparator circuit 38 comprises a PNP transistor having its emitter connected to the emitter of transistor 62, and its base connected to the emitter of transistor 62, and its base connected to the emitter of transistor 64. The collector of the transistor 70 is connected to a bias voltage source Vcc of −6 v. through a resistor 72. The output of the comparator circuit means 38 is developed between the collector of transistor 70 and ground; this control output pulse is applied to the motor 40 and is identified as $e$ in FIG. 3.

OPERATION OF THE DEVICE

When it is desired to focus upon a subject, the predetermined delineated area on the viewfinder is pointed toward the subject. The optical intelligence viewed in the predetermined delineated area is "seen" by the lens means 14. Concurrently, the zoom lens 10 is displaced along its optical axis by means of motor 40. The zoom lens 10 may be displaced from its hyperfocal (infinity) setting toward its near setting or conversely; however, it is preferable to displace the zoom lens 10 from its near setting toward its hyperfocal setting.

The light received by the lens means 14 is passed to the beam splitter 16. Beam splitter 16 reflects the light toward the photoconductive transducer means 18 and 24. Since the rotating reticle 22 comprises light and dark radial bars, one-half the light is lost. The neutral density filter 20 compensates for this, so that the photodiode 18 receives the same amount of light. (The neutral density filter is neutral in that it passes all colors equally, and its density is preselected for attenuation so that the photodiode 18 receives the same amount of light as does the photodiode 24). Stated differently, the light incident on the photodiodes has the same steady-state or DC value, although as will be seen, photodiode 18 receives unmodulated light, while photodiode 24 receives modulated light.

The light passing to the diode 24 is modulated by the reticle disk 22 rotating so that the image focused on the disk 22 is transmitted as a sinusoidally fluctuating illumination in the order of 20 cycles per second.

Referring now especially to FIG. 2 the photodiodes 18, 24 are matched and balanced, and may be observed in FIG. 2 the PN junction is reverse biased. When equal illumination falls on the photodiodes 24 and 18, the current to the preamplifier 28 is zero. If more light is falling on the photodiode 24 than on the photodiode 18, the photocurrent into the preamplifier will be $I_{24}$ minus $I_{18}$. The photodiode pair 18, 24 serves as a difference amplifier, eliminating the so-called DC or steady-state component of the light, so that only the varying current resulting from modulation of the light is applied to the preamplifier 28. Effectively then the background light or the so called DC level of the illuminated scene has been eliminated.

The output of the preamplifier 28 is passed onto the bandpass amplifier 30 which passes on and amplifies a band of frequencies centered around the frequency of 20 cycles. The band-pass amplifier 30 effectively eliminates the troublesome 120 Hz. harmonic contributed principally by room lighting.

Figure 4:
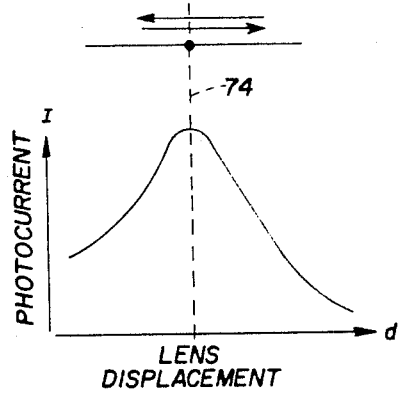
FIG. 4 is a diagram illustrating the relationship between photocurrent output and displacement from true focus position.

Referring now to FIG. 4 the photocurrent I is shown as a function of the displacement of the zoom lens 10; the true focus position will develop a maximum current as indicated by the ordinate at 74.

The voltage input to the capacitor 42 has somewhat the appearance shown in FIG. 5a; the clamping circuit 32 effectively clamps or bottoms this input wave to a reference potential. The clamped wave is shown in FIG. 5b, where the voltage across resistor 46 is identified at 76.

The clamped signal is applied to the first and second integrator means 34, 36 respectively. The first integrator means 34 has substantially no effective discharge path (as will be explained later the discharge through the conducting transistor 62 is negligible) so that the electrolytic capacitor 50 charges to the average peak value of the input voltage, and holds this charge even when the signal declines in magnitude. The charge developed across electrolytic capacitor 50 is identified at 78 in FIG. 5b.

The second integrator means 36 is a short term integrator having a discharge path through bleed resistor 58. The electrolytic capacitor 56 also charges to the average peak input signal but follows the falling average signal with a time constant RC (resistor 58, capacitor 56), that is short compared with the rate of change of focus; this latter voltage excursion across electrolytic capacitor 56 is identified at 80 in FIG. 5b.

The transistor 62 is normally nonconducting but begins to conduct when the charge on the capacitor 50 reaches the order of +0.6 v.; similarly transistor 64, normally nonconducting, begins conducting when the charge on electrolytic capacitor 56 reaches the order of +0.6 v. Since the input impedance of each transistor 62, 64 is quite high, no appreciable charge is lost by these electrolytic capacitors through the conducting transistors.

The comparator transistor 70 is nonconducting in the early stages because its base-to-emitter potential is substantially zero. As the voltage charge on the electrolytic capacitor 56 falls as shown in FIG. 5b:80, then the emitter-to-base potential increases until the transistor 70 is forward biased and conducts; this provides the output $e$ out of the comparator circuit, and is shown in FIG. 5c.

Figure 5:
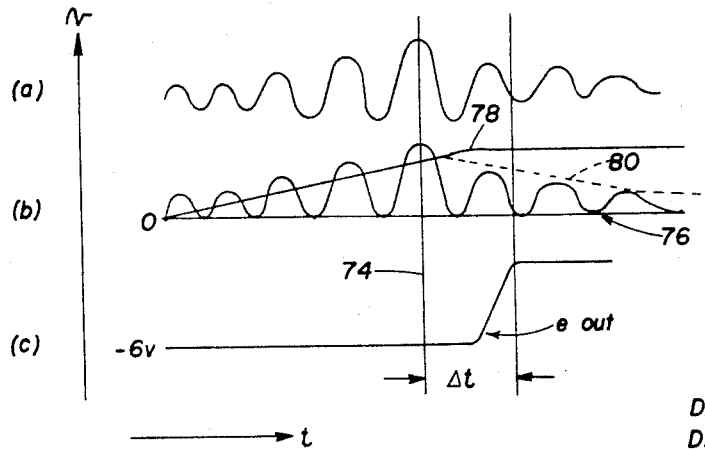
FIGS. 5 (a), (b) and (c) are a series of voltage waveforms used in explaining the operation of the device.

Since true focus obtains at the peak of the photocurrent 74, the comparator circuit 38 does not provide an output pulse until some time later ($\Delta t$) as shown in FIG. 5. The output signal $e$ out is therefore derived later in time than the actual focus condition. However $\Delta t$ can be substantially reduced to the point of practical utilization by using care in the selection of the mechanical and electrical parameters for the device.

The invention has been described in detail with particular reference to preferred embodiments thereof, but it will be understood that variations and modifications can be effected within the spirit and scope of the invention.

We claim:

1. In apparatus for focusing an image of a subject in an image plane, the combination comprising:
   a. a movable lens for receiving and transmitting light reflected from the subject to form an image of the subject in said image plane and movable along a predetermined path to focus the image of the subject in said image plane;
   b. means positioned between said lens and said image plane and adapted to intercept a portion of the light transmitted by said lens and for diverting such light portion along a path;

c. means disposed in said image plane for modulating at a selected frequency the light transmitted from said lens to said image plane;

d. first photosensitive means disposed to receive said modulated light and produce a first modulated signal having a parameter the magnitude of which varies as a function of the distance of said lens relative to the subject, second photosensitive means disposed in said light path and adapted to receive said diverted light portion from said diverting means and produce a second unmodulated signal having a parameter the magnitude of which varies as a function of the distance of said lens relative to the subject;

e. means including said first and second photosensitive means and responsive to said first and second signals for producing a third signal characterized by a parameter which has a particular magnitude when said image is focused; and f. means coupled to said third signal-producing means and adapted to detect said particular magnitude of said parameter during movement of said lens to indicate that said image is focused in said image plane.

2. In apparatus for focusing an image of a subject in an image plane, the combination comprising:

a. a movable lens for receiving and transmitting light reflected from the subject to form an image of the subject in said image plane and movable along a predetermined path to focus the image of the subject in said image plane;

b. means positioned between said lens and said image plane and adapted to intercept a portion of the light transmitted by said lens and for diverting such light portion along a path;

c. means disposed in said image plane for modulating at a selected frequency the light transmitted from said lens to said image plane;

d. first photosensitive means disposed to receive said modulated light and produce a first signal having a parameter the magnitude which varies as a function of the distance of said lens relative to the subject, second photosensitive means disposed in said light path and adapted to receive said diverted light portion from said diverting means and produce a second signal having a parameter the magnitude of which varies as a function of the distance of said lens relative to the subject;

e. means for selectively passing the light in said light path so as to equalize the light intensity received by said first and second photosensitive means;

f. means including said first and second photosensitive means and responsive to said first and second signals for producing a third signal characterized by a parameter which has a particular magnitude when said image is focused; and g. means coupled to said third signal-producing means and adapted to detect said particular magnitude of said parameter during movement of said lens to indicate that said image is focused in said image plane.

3. In apparatus for focusing an image of a subject in an image plane, the combination comprising:

a. a movable lens for receiving and transmitting light reflected from the subject to form an image of the subject in said image plane and movable along a predetermined path to focus the image of the subject in said image plane;

b. means positioned between said lens and said image plane and adapted to intercept a portion of the light transmitted by said lens and for diverting such light portion along a path;

c. means disposed in said image plane for modulating at a selected frequency the light transmitted from said lens to said image plane; adapted d. first photosensitive means disposed to receive said modulated light and produce a first signal having a parameter the magnitude which varies as a function of the distance of said lens relative to the subject, second photosensitive means disposed in said light path and adapted to receive said diverted light portion from said diverting means and produce a second signal having a parameter the magnitude which varies as a function of the distance of said lens relative to the subject;

e. means including said first and second photosensitive means and responsive to said first and second signals for producing a third signal characterized by a parameter which has a particular magnitude when said image is focused; and f. signal-filtering means coupled to said third signal-producing means and having a band pass the center of which corresponds substantially to said selected frequency to produce a fourth signal characterized by a parameter having a particular magnitude when said lens is focused; and g. means coupled to said third signal-producing means and adapted to detect said particular magnitude of said parameter during movement of said lens to indicate that said image is focused in said image plane.

4. The invention as set forth in claim 3 wherein said parameter is amplitude and said particular magnitude is a maximum amplitude condition.

5. The invention as set forth in claim 4 including means for continuously moving said lens through said range of positions and indicating means includes means for arresting the movement of said lens when said maximum amplitude is detected.

6. In a photographic camera, an automatic focus device having lens means movable in predetermined incremental displacements between near and hyperfocal positions in relation to a subject to be photographed to focus an image of the subject in an image plane, the combination comprising:

a. means operatively associated with the lens means for receiving reflected light from a preselected area on the subject;

b. means for projecting said received reflected light along first and second light paths;

c. means disposed in the image plane for modulating the projected light in said first light path at a predetermined frequency to provide modulated light signals;

d. first and second photoelectric transducer means positioned in said first and second light paths to receive said modulated and unmodulated light signals respectively;

e. means for selectively passing the projected light in said second light path, so as to equalize the light intensity received by said first and second photoelectric transducer means in both said light channel paths;

f. means for differentially connecting said first and second photoelectric transducer means to provide successive difference AC electrical signals having a maximum amplitude when the image is focused;

g. circuit means coupled to said differential connecting means for processing said successive difference AC electrical signals to derive a control signal when said AC difference electrical signals decline from said maximum amplitude; and h. means coupled to said circuit means and responsive to said control signal to position the lens means to focus the image.

7. A device according to claim 6 wherein:

b'. Said projecting means comprises beam splitter optical means.

8. A device according to claim 6 wherein:

c'. said modulating means comprises a rotating disk having alternate light-admitting and opaque areas spaced at predetermined intervals.

9. A device according to claim 6 wherein:

d'. said selective passing means is a neutral light filter of predetermined density.

10. A device according to claim 6 wherein:

e'. said first and second photoelectric transducer means comprise matched photodiodes; and f'. said differential connecting means comprises serially connecting said matched photodiodes with output connections between the common connection of the serial combination and ground to provide said successive difference AC electrical signals.

11. A device according to claim 6 wherein:

g'. said circuit means comprises: band-pass amplifier means, clamping means, first and second integrator means, and comparator means, said band-pass amplifier means being connected to receive said successive difference AC electrical signals and provide a band-pass-amplified output to said clamping means, said clamping means clamping said band-pass-amplified output at a reference potential, the output of said clamping means being applied simultaneously to said first and second integrator means, said first integrator means storing a charge equal to the highest potential excursion of said simultaneous-applied signals, said second integrator means having an RC time constant which is short compared with the time rate of change in focus to said subject, and storing a charge than can decrease in response to a decrease in magnitude of the said simultaneous-applied signals, the outputs of the first and second integrator means being applied as dual inputs to said comparator means, whereby a difference in said dual inputs provides said control signal at the output of said comparator means.

* * * * *